(12) United States Patent
Grewal et al.

(10) Patent No.: US 7,483,423 B2
(45) Date of Patent: Jan. 27, 2009

(54) AUTHENTICITY OF COMMUNICATIONS TRAFFIC

(75) Inventors: Karanvir Grewal, Hillsboro, OR (US); David M. Durham, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 657 days.

(21) Appl. No.: 11/096,843

(22) Filed: Mar. 30, 2005

(65) Prior Publication Data

US 2006/0227773 A1 Oct. 12, 2006

(51) Int. Cl.
*H04L 12/56* (2006.01)
(52) U.S. Cl. ...................... 370/389; 370/252
(58) Field of Classification Search .............. 370/252; 713/168
See application file for complete search history.

(56) References Cited

U.S. PATENT DOCUMENTS

| 6,633,652 | B1* | 10/2003 | Donescu | 382/100 |
| 7,096,359 | B2* | 8/2006 | Agrawal et al. | 713/168 |
| 2005/0232161 | A1* | 10/2005 | Maufer et al. | 370/252 |

OTHER PUBLICATIONS

PCI-SIG "PCI Specifications," www.pcisig.com, copyright 2004; 18 pp.
Deering, et al., "Internet Protocol, V.6 Specification," Internet Engineering Task Force, Network Working Group, Request for Comments 2460; Dec. 1998; 37 pp.
Krueger, et al. "Small Computer Systems Interface protocol over the Internet (iSCSI) Requirements and Design Considerations," Network Working Group of The Internet Society, RFC 3347, (2002), 23 pp.
Shanley, T. and D. Anderson, "PCI System Architecture, 4th edition," Mindshare, Inc., 1999; Chapters 1 & 2, 61 pp.
Postel, J. "User Datagram Protocol," Internet Engineering Task Force Request for Comments 768, 8-28-80, 3 pp.
"Serial ATA: High Speed Serialized AT Attachment," Serial ATA Workgroup rev. 1.0, Aug. 29, 2001; 36 pp.
"Transmission Control Protocol: DARPA Internet Program Protocol Specification," Information Sciences Institute for Defense Advanced Research Projects Agency, RFC 793, (Sep. 1981), 80 pp.
"Internet Protocol: DARPA Internet Program Protocol Specification," Information Sciences Institute for Defense Advanced Research Projects Agency, RFC 791, (Sep. 1981), 44 pp.
IEEE Std 802.3—2002, Part 3: Carrier sense multiple access with collision detection (CSMA/CD) access method and physical layer specifications, Mar. 8, 2002; 33 pp.
"dpANS Fibre Channel Protocol for SCSI," X3.269-199X, Revision 12, Dec. 4, 1995; 75 pp.

(Continued)

*Primary Examiner*—Thong H Vu
(74) *Attorney, Agent, or Firm*—Konrad Raynes & Victor LLP; Janaki K. Davda (57) ABSTRACT

Provided are a techniques for storing information in a packet. A data integrity operation is performed over one portion of the packet to calculate an integrity check value using a secret key. The data transformation operation is performed over another selectable portion of the packet to store the integrity check value in the other portion of the packet, without increasing a size of the packet.

Other embodiments are described and claimed.

26 Claims, 10 Drawing Sheets

OTHER PUBLICATIONS

"dpANS Information Technology—SCSI Architecture Model—2 (SAM-2)," T10 Project 1157-D, www.t10.org, 91 pp., Sep 12, 2002.

"dpANS Information Technology—SCSI Controller Commands-2 (SCC-2)," X3T10/1225D rev. 4, Sep. 12, 1997; 23 pp.

ITU-T Data Networks and Open System Communications, "Information Technology—Open Systems Interconnection—Basic Reference Model: The Basic Model," ITU-T Recommendation X.200, Jul. 1994; 63 pp.

IPsec definition, http://searchsecurity.techtarget.com; web search Feb. 15, 2005; 3 pp.

* cited by examiner

AUTHENTICITY OF COMMUNICATIONS TRAFFIC

BACKGROUND

Conventional security protocols offer data confidentiality (also referred to as "data encryption") and data integrity (also referred as "authentication)" to data packets and datagrams being transmitted between interested parties. A packet or datagram may be described as a unit of data that is routed between an origin and a destination, containing addressing information, protocol control and data information. Within the context of the description herein, the transmitted unit of data may be referred to as a packet, a datagram or a frame and is intended to signify a generic block of data.

Data encryption provides confidentiality by using an encryption operation and a secret key to process the original data (also referred to as "plaintext") and transforms this into encrypted data (also referred to as "cyphertext"). A secret key may be described as a piece of data shared between two or more parties when using symmetric key cryptography and a private key pertinent to one party with an associated public key available to the data receiving party when using asymmetric key cryptography. The encryption operation does not change the size of data from the input stream to the output stream, but changes the value of the data. The receiver of the data performs a reverse encryption operation by using the same (symmetric) or different (asymmetric) secret key to retrieve the original data. A reverse encryption operation may be described as an operation that performs the same or similar steps of the original encryption operation in a contrary order.

Data integrity provides a mechanism to ensure that a given data stream has not been modified while being transmitted between two entities across some transport medium. This is achieved by using the input stream and performing a data integrity operation on that input stream to determine its integrity. The data integrity operation performs a calculation using some one way operation such as a hash function, resulting in a Cyclic Redundancy Check (CRC) value or an Integrity Check Value (ICV). The data integrity operation may involve an additional secret key that is input into the calculation to increase security. The result is a computed integrity check value (also referred to as a "checksum") of a pre-defined length that is technique specific. This integrity check value is traditionally transmitted as an addition to the original data. The receiver of the data performs the same calculation on the data to compute the integrity check value. The computed integrity check value is then compared with the integrity check value transmitted with the data, and, if they match, it is determined that the data was not modified in transit. Existing techniques operating in this manner expand the packet size by transmitting the integrity check value with the data packet.

Data integrity operations have been employed for many years and have had a more notable impact in recent times with the usage of tunneling protocols. A tunneling protocol may be described as protocol that allows isolation of a packet, preserving the packet, and enables the packet to be sent between two points. With current techniques, the integrity check value is carried as additional data within the packet. That is, the addition of the integrity check value expands the packet size as a result of transmitting the integrity check value with the packet. Expansion of the packet size requires dealing with associated overhead on the sending/receiving and intermediate nodes. The expansion may also have implications for the sending/receiving and intermediate nodes in conveying the packet between nodes. These implications are generally associated with handling larger packet sizes, which may result in recalculation of the MTU size for the transmission of the packet or lead to fragmentation of the packet. Finally, additional headers may be needed, and legacy infrastructure components may not be able to recognize the modified frame format, making deployment difficult.

Figure 1:
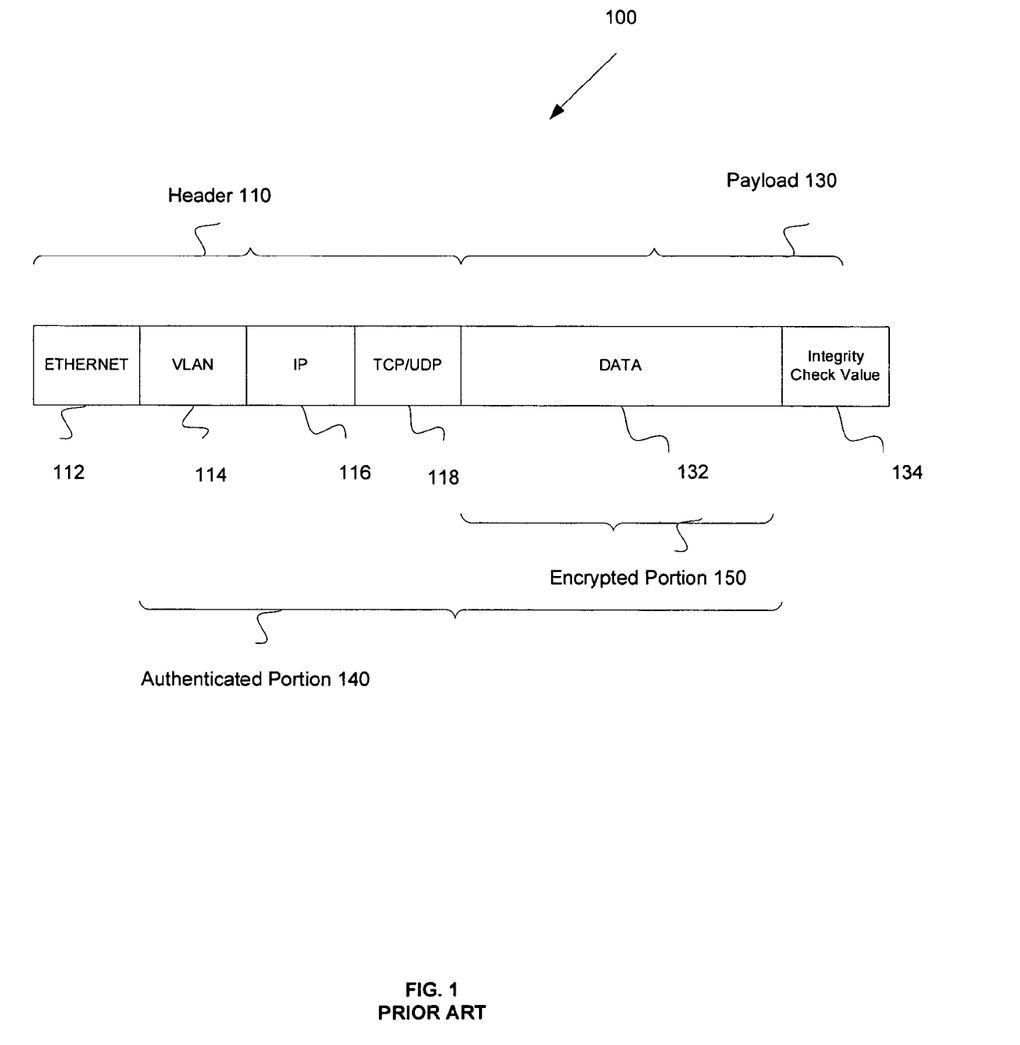
FIG. 1 illustrates a prior art packet.

FIG. 1 illustrates a prior art packet 100. The packet 100 includes a header 110 and a payload 130. The header 110 includes an Ethernet field 112, an optional Virtual Local Area Network (VLAN) field 114, an Internet Protocol (IP) field 116, and a Transmission Control Protocol (TCP)/User Datagram Protocol (UDP) field 118. The Ethernet field 112 indicates that the Ethernet protocol is being used (IEEE std. 802.3, published Mar. 8, 2002), Fibre Channel (American National Standards Institute (ANSI) X3.269-199X, Revision 012, Dec. 4, 1995). The IP field 116 indicates that the Internet Protocol is being used (Internet Engineering Task Force (IETF) Request for Comments (RFC) 791, published September 1981, RFC 2460, published December 1998). The TCP/UDP field 118 indicates whether the Transmission Control Protocol (Transmission Control Protocol DARPA Internet Program Protocol Specification, Request for Comments (RFC) 791 and 793, September 1981) or the User Datagram Protocol (Internet Engineering Task Force (IETF) Request for Comments (RFC) 768, Aug. 28, 1980) is being used. The header information described in FIG. 1 is provided as an example for illustration purposes only and may take a different form in another data exchange. The payload 130 includes a data field 132 for storing data and an Integrity Check Value (ICV) field 134 for storing the integrity check value. In FIG. 1, a data integrity operation is performed on the information in the VLAN field 414, the IP field 416, the TCP/UDP field 418, and the data field 132, which fields are also referred to as an authenticated portion 240 of the packet. For this example, the integrity check value that is calculated by the data integrity operation is stored in the ICV field 134. Also, the data in the data field 132 is an encrypted portion 150 of the packet.

Open Systems Interconnection (OSI) is a standard description for how messages may be transmitted between two points in a network. (International Organization of Standards (ISO), International Telecommunications Union (ITU), Recommendation X.200, July 1994). With OSI, communication between two end points in a network is divided into seven layers, with each layer adding certain functions. When a message is sent originating from Layer 7, the message goes down through the seven layers. When the message is received destined for Layer 7, the message goes up through the seven layers. Layer 3 of the seven layers handles the routing of the data for the network, and Layer 2 of the seven layers provides transmission protocol knowledge.

In a traditional security technique that provides data confidentiality and data integrity services, the data confidentiality service is provided over an upper layer protocol, such as TCP or UDP and associated data, for a Layer 3 technique, unless some form of tunneling is employed. This may extend to the IP header and beyond for a Layer 2 technique. For the Layer 3 technique, data integrity is provided over the entire packet, up to the IP field 116 or TCP/UDP field 118 and may extend up to and include the Ethernet field 112 for a Layer 2 technique. In both cases, the integrity check value is transmitted with the packet, generally at the end of the packet.

In the example of FIG. 1, although the data confidentiality may not add any additional overhead to the packet (depending on the encryption operation employed and associated padding or Initialization Vector (IV) requirements), the integrity check value adds overhead to the packet, resulting in an expansion of the packet size. Padding may be described as adding bits to a packet to meet a pre-defined boundary, required by the technique employed. For encryption, an Initialization Vector is a nonsecret binary vector that is used as the initializing input for the encryption of plaintext.

Thus, there is a need in the art for improved data transmission techniques.

BRIEF DESCRIPTION OF THE DRAWINGS

Referring now to the drawings in which like reference numbers represent corresponding parts throughout:

FIG. 5 illustrates operations for processing a packet that is about to be transmitted in accordance with certain embodiments, wherein FIG. 5 is illustrated as FIGS. 5A and 5B.

FIG. 6 illustrates operations for processing a packet that has been received in accordance with certain embodiments, wherein FIG. 6 is illustrated as FIGS. 6A and 6B.

DETAILED DESCRIPTION

In the following description, reference is made to the accompanying drawings which form a part hereof and which illustrate several embodiments. It is understood that other embodiments may be utilized and structural and operational changes may be made.

Figure 2:
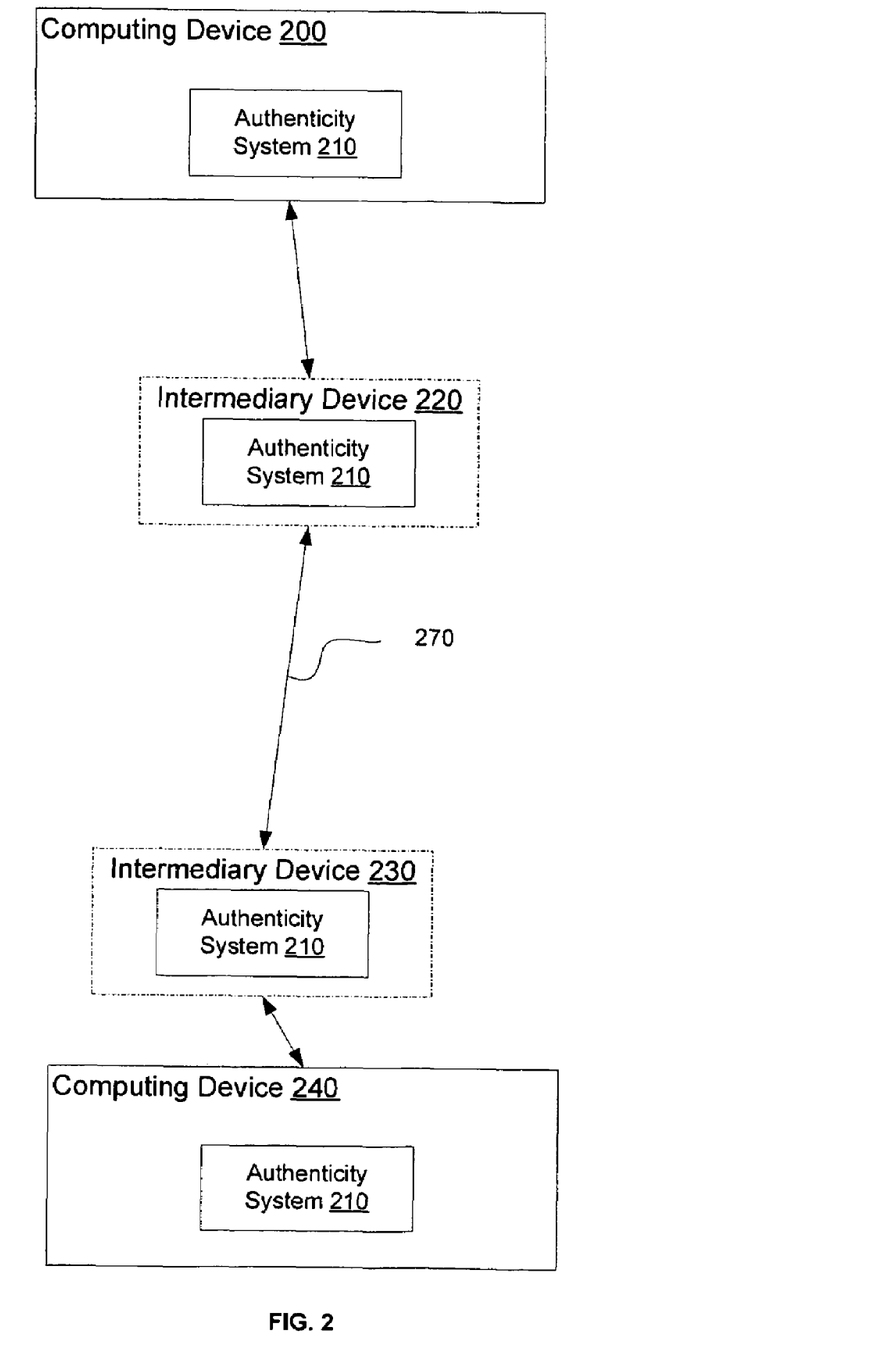
FIG. 2 illustrates details of a computing environment in accordance with certain embodiments.

FIG. 2 illustrates details of a computing environment in accordance with certain embodiments. A computing device 200 is connected to another computing device 240 via a communication path 270. One or more intermediary devices 220, 230 may also be optionally coupled to the communication path 270. An intermediary device may be, for example, a router, a switch or an appliance. In certain embodiments, each computing device 200, 240 includes an authenticity system 210. The authenticity system 210 may comprise, by way of example, software or hardware and/or combinations of software and hardware. In certain other embodiments, the authenticity system 210 is located at each of the intermediary devices 220, 230 instead of at the computing devices 200, 240. In yet other embodiments, the authenticity system 210 is located at a combination of computing devices 200, 240 and intermediary devices 220, 230. The authenticity system 210 enables an integrity check value to be added to a packet that is to be transmitted over the communication path 270 without increasing the size of the packet. Additionally, the authenticity system 210 enables the integrity check value to be removed from a received packet in order to access the data in the packet.

Communication path 270 may be any type of connection that enables communication, such as, for example, a Storage Area Network (SAN), a Local Area Network (LAN), Wide Area Network (WAN), the Internet, an Intranet, a bus, etc.

Figure 3:
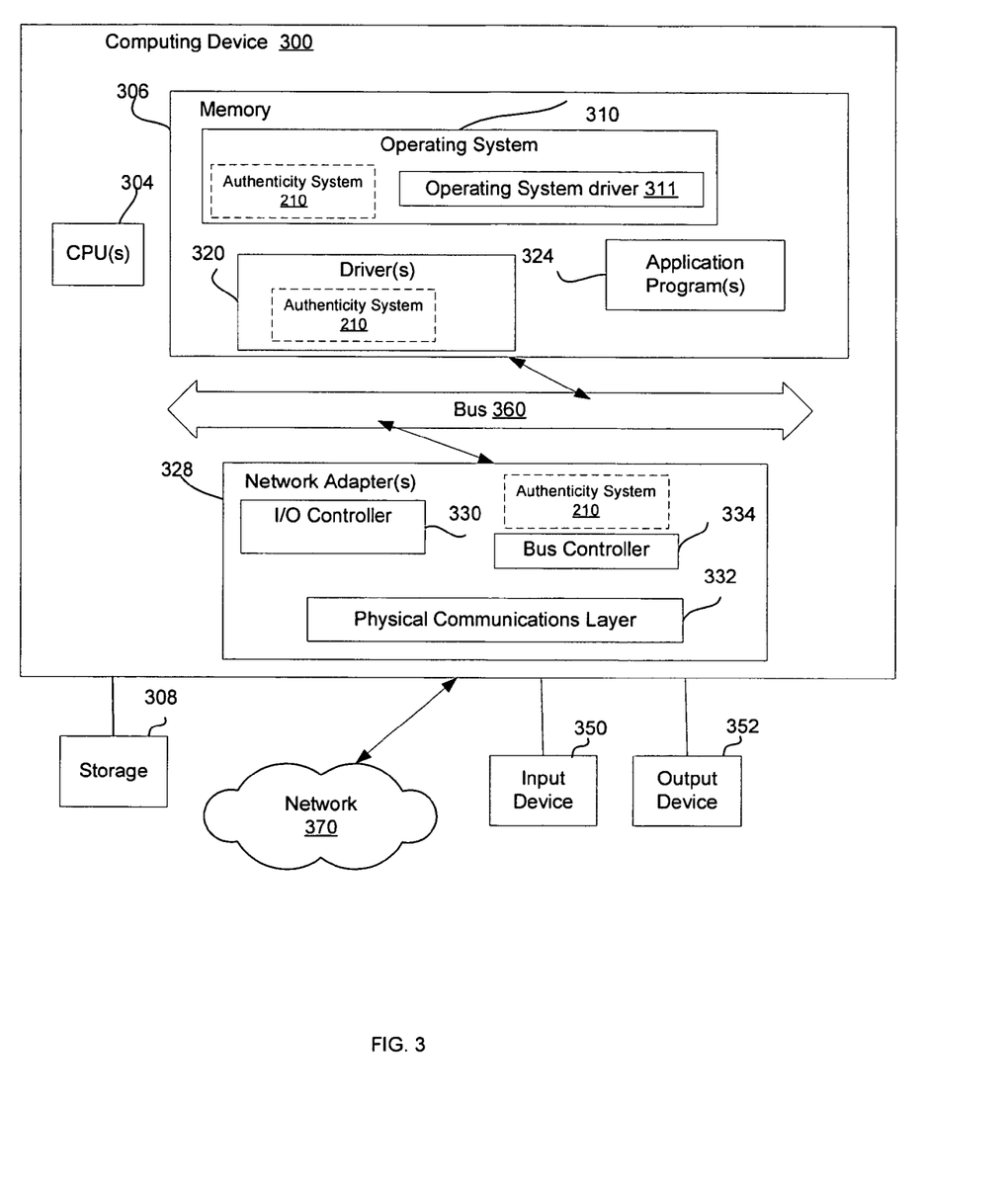
FIG. 3 illustrates details of a computing device in accordance with certain embodiments.

FIG. 3 illustrates details of a computing device 300 in accordance with certain embodiments. Computing devices 200 or 240 may implement the architecture of computing device 300. The computing device 300 (e.g., a host computer) includes one or more central processing units (CPUs) 304 (i.e., processors), a volatile memory 306, non-volatile storage 308 (e.g., magnetic disk drives, optical disk drives, a tape drive, etc.), and one or more network adapters 328. The one or more network adapters 328 may be said to be coupled to a network 370 (a type of communication path).

Memory 306 stores an operating system 310. The operating system 310 may include operating system drivers, such as an operating system driver 311. One or more drivers 320 (e.g., storage drivers or network drivers) and one or more application programs 324 may be stored in memory 306 and are capable of transmitting and retrieving packets from remote computing devices (e.g., host computers or storage systems) over the network 370.

The computing device 300 may comprise any suitable computing device, such as a mainframe, server, personal computer, workstation, laptop, handheld computer, telephony device, network appliance, virtualization device, storage controller, etc. Any suitable CPU 304 and operating system 310 may be used. Programs and data in memory 306 may be swapped into storage 308 as part of memory management operations.

Network 370 may be any type of network such as, for example, a Storage Area Network (SAN), a Local Area Network (LAN), Wide Area Network (WAN), the Internet, an Intranet, etc.

In various embodiments, the authenticity system 210 may coupled to the operating system 310, may be a driver 320, or may be coupled to a network adapter 328. The broken lines around each illustration of the authenticity system 210 are used to indicate its optional location at the operating system 310, driver 320, or network adapter 328. In certain embodiments, one authenticity system 210 is implemented at a computing device 300.

Each network adapter 328 includes various components implemented in the hardware of the network adapter 328. Each network adapter 328 is capable of transmitting and receiving packets of data over the network 370.

Each driver 320 executes in memory 306 and includes network adapter 328 specific commands to communicate with each network adapter 328 and interface between the operating system 310 and each network adapter 328. Each network adapter 328 or driver 320 implements logic to process packets, such as a transport protocol layer to process the content of messages included in the packets that are wrapped in a transport layer, such as Transmission Control Protocol (TCP) and/or Internet Protocol (IP), the Internet Small Computer System Interface (iSCSI) (IETF RFC 3347, published 2002), Fibre Channel (American National Standards Institute (ANSI) X3.269-199X, Revision 012, Dec. 4, 2995), or any other suitable transport layer protocol.

When the authenticity system 210 is implemented in the network adapter 328, the authenticity system 210 determines the authenticity of a received packet by removing the integrity check value from the packet. The transport protocol layer unpacks the payload from the received TCP/IP packet and transfers the data to a driver 320 to return to the application program 324. Further, an application program 324 transmitting data transmits the data to a driver 320, which then sends the data to the transport protocol layer to package in a TCP/IP packet before transmitting over the network 370. Before the transmission, the authenticity system 210 adds the integrity check value to the packet, without increasing the size of the packet.

If the authenticity system 210 is implemented as a driver 320 or as part of the operating system 310, then the integrity check value for a received packet and for a packet that is to be transmitted is processed when the packet is sent to the driver 320 or operating system 310.

A bus controller 334 enables each network adapter 328 to communicate on a computer bus 360, which may comprise any suitable bus interface, such as any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 3.0a, published 2002), published March 2002), Small Computer System Interface (SCSI) (American National Standards Institute (ANSI) SCSI Controller Commands-2 (SCC-2) NCITS.318:1998), Serial ATA (SATA 3.0a Specification, published Feb. 4, 2003), etc.

The network adapter 328 includes a network protocol for implementing a physical communication layer 332 to send and receive network packets to and from remote data storages over the network 370. In certain embodiments, the network adapter 328 may implement the Ethernet protocol, or any other suitable network communication protocol.

The network adapter 328 includes an Input/Output (I/O) controller 330. In certain embodiments, the I/O controller 330 may comprise Internet Small Computer System Interface (iSCSI controllers), and it is understood that other types of network controllers, such as an Ethernet Media Access Controller (MAC) or Network Interface Controller (NIC), or cards may be used.

The storage 308 may comprise an internal storage device or an attached or network accessible storage. Programs in the storage 308 may be loaded into the memory 306 and executed by the CPU 304. An input device 350 is used to provide user input to the CPU 304, and may include a keyboard, mouse, pen-stylus, microphone, touch sensitive display screen, or any other suitable activation or input mechanism. An output device 352 is capable of rendering information transferred from the CPU 304, or other component, such as a display monitor, printer, storage, etc.

In certain embodiments, in addition to one or more drivers 320, the computing device 300 may include other drivers, such as a transport protocol driver (not shown) that performs the functions of the transport protocol layer.

The network adapter 328 may include additional logic to perform additional operations to process received packets from the computer 300 or the network 370. Further, the network adapter 328 may implement a transport layer offload engine (TOE) to implement the transport protocol layer in the network adapter as opposed to the driver 320 to further reduce computing device processing burdens. Alternatively, the transport layer may be implemented in a driver 320.

Various structures and/or buffers (not shown) may reside in memory 306 or may be located in a storage unit separate from the memory 306 in certain embodiments.

Figure 4:
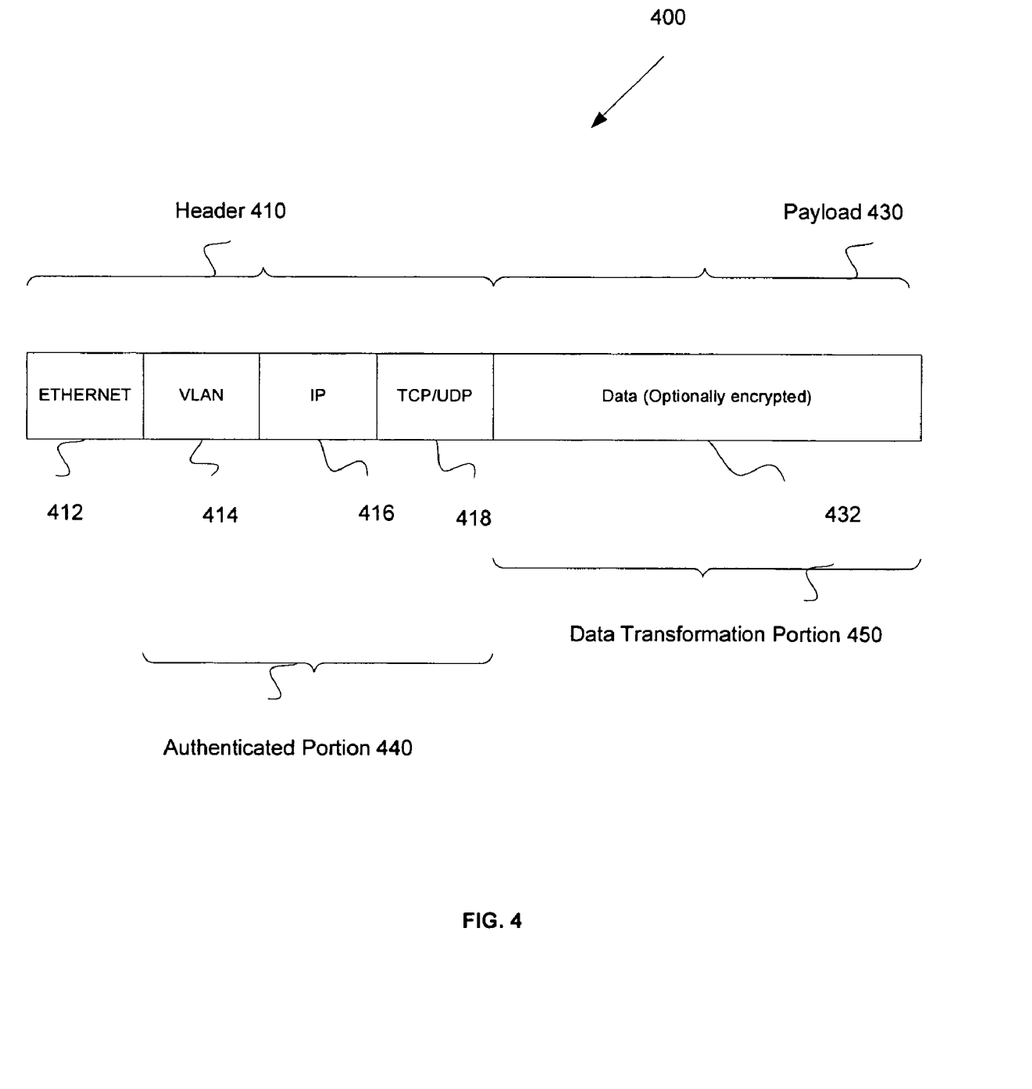
FIG. 4 illustrates a packet in accordance with certain embodiments.

FIG. 4 illustrates a packet 400 in accordance with certain embodiments. The packet 400 includes a header 410 and a payload 430. The header 410 includes an Ethernet field 412; an optional Virtual Local Area Network (VLAN) field 414, an Internet Protocol (IP) field 416, and a Transmission Control Protocol (TCP)/User Datagram Protocol (UDP) field 418. The payload 430 includes a data field 432 storing data that may optionally be encrypted before or after application of the integrity transformation. The Ethernet field 412, IP field 416, and TCP/UDP field 418 each contain a source address and a destination address that identify the sender computing device and the receiver computing device, respectively. In this example, a data integrity operation is performed on the information in the VLAN field 414, the IP field 416, and the TCP/UDP field 418, which fields are also referred to as the authenticated portion 440 of the packet. For this example, the integrity check value that is calculated by the data integrity operation is added to the data using a data transformation operation.

A data transformation operation may be described as an operation for transforming data without changing the size of the data or may be described as a "reversible operation" (i.e., an operation that has a corresponding reverse data transformation operation). A reverse data transformation operation may be described as an operation that performs the same or similar steps of the data transformation operation performed on the transmitted packet, but in a contrary order. In certain embodiments, the data transformation operation transforms the data and allows integrity data to be carried transparently within a packet. In certain embodiments, a cryptographically meaningful integrity check value is transmitted over an existing payload using a data transformation operation, such that performing the same data transformation operation or a reverse data transformation operation on the receiver computing device results in recovery of the original data.

The data field 132 is also referred to as the data transformation portion 450. The packet 400 of FIG. 4 is used merely to illustrate one embodiment. In various embodiments, the authenticated portion 440 and the data transformation portion 450 may vary in the fields that each includes, but the authenticated portion 440 and the data transformation portion 450 use different fields.

In certain embodiments, the data transformation operation is fluid in nature and may change on a per flow or per connection basis, where the data transformation operation employed by the sender computing device 200, 240 and the receiver computing device 200, 240 is negotiated. The negotiations may be in an Out-Of-Band (OOB) manner and may describe which fields are to be used for the integrity check value calculation, as well describing which portion of the packet is used for carrying this information. Furthermore, this out-of-band channel may also describe whether any data confidentiality operation is performed before or after any integrity transformation of the data. Out-Of-Band communications may be described as those that occur between a sender computing device 200, 240 and a receiver computing device 200, 240 on a different channel that is used for the purpose of exchanging such information.

Embodiments modify the packet transmitted in such a way that the integrity check value does not expand the packet size or add additional header information that may break legacy devices and complicate deployment.

In certain embodiments, a VLAN field 414 includes one or more tags that are capable of identifying a secret key used to calculate the integrity check value, the data transformation operation, and one or more portions of the packet to be used for the data transformation operation. In yet other embodiments, this information is provided in an unused (or redundant) field of the packet. A secret key may be described as a piece of data (e.g., a confidential piece of data) shared between a sender computing device and a receiver computing device.

In certain embodiments, a VLAN field 414 includes one or more tags that are capable of providing additional identity information of an entity, security posture information, and role information for that entity, which may be leveraged by a recipient for applying one or more access control policies. In yet other embodiments, this information is provided in an unused (or redundant) field of the packet.

Embodiments may leverage the VLAN tags (if present) in the VLAN field 414 to convey additional identity information that may be used for role-based access control and selection of security operations to be performed. The additional information may be referred to as "security posture information." In particular, a computing device 200, 240 may have multiple components that share a single network adapter, and each of these multiple components may have a different role. Therefore, each component may indicate its role in the VLAN tags. Then, based on the role, the receiver determines the secret key to be used to perform the data integrity operation. For example, the additional identify information may relate to the security posture of a platform or group membership, or may be other identity information that transcends IP and MAC addressing.

Many existing infrastructure devices already allow for the additional VLAN tag in frame size calculations, so use of the VLAN tags will be recognized by existing infrastructure devices that properly handle VLAN tags.

Embodiments may be used in conjunction with a trusted entity so that the trusted entity may vouch for its host platform's traffic. A trusted entity may be described as each of two peers in a relationship with access to a secret key that is shared between them. That is, only the trusted entity is given the secret key used to calculate the data integrity information of a frame, and only the trusted entity is able to configure the authenticity system 210 to calculate the integrity check value for a frame and transparently embed it into the frame. By vouching for the host's frames on a frame-by-frame basis, it is possible to communicate to peers and the network infrastructure information about the security posture of the host. Such security posture information could be associated with a VLAN tag that equates to the compliance level of the platform to administrative security policies including: a trusted entity verifying that the required host security agents are installed on the host and/or are running and properly configured. Other security posture information could include the current patch level of the operating system and applications as well as the verification that the correct firewall rules are being enforced by the host.

Figure 5:
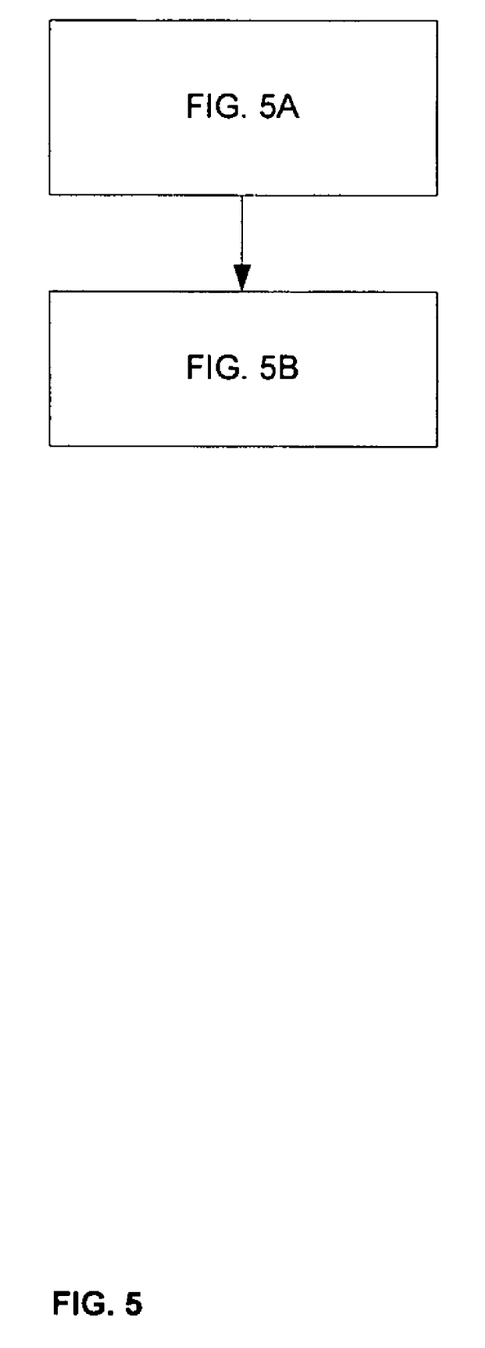
Figure 5A:
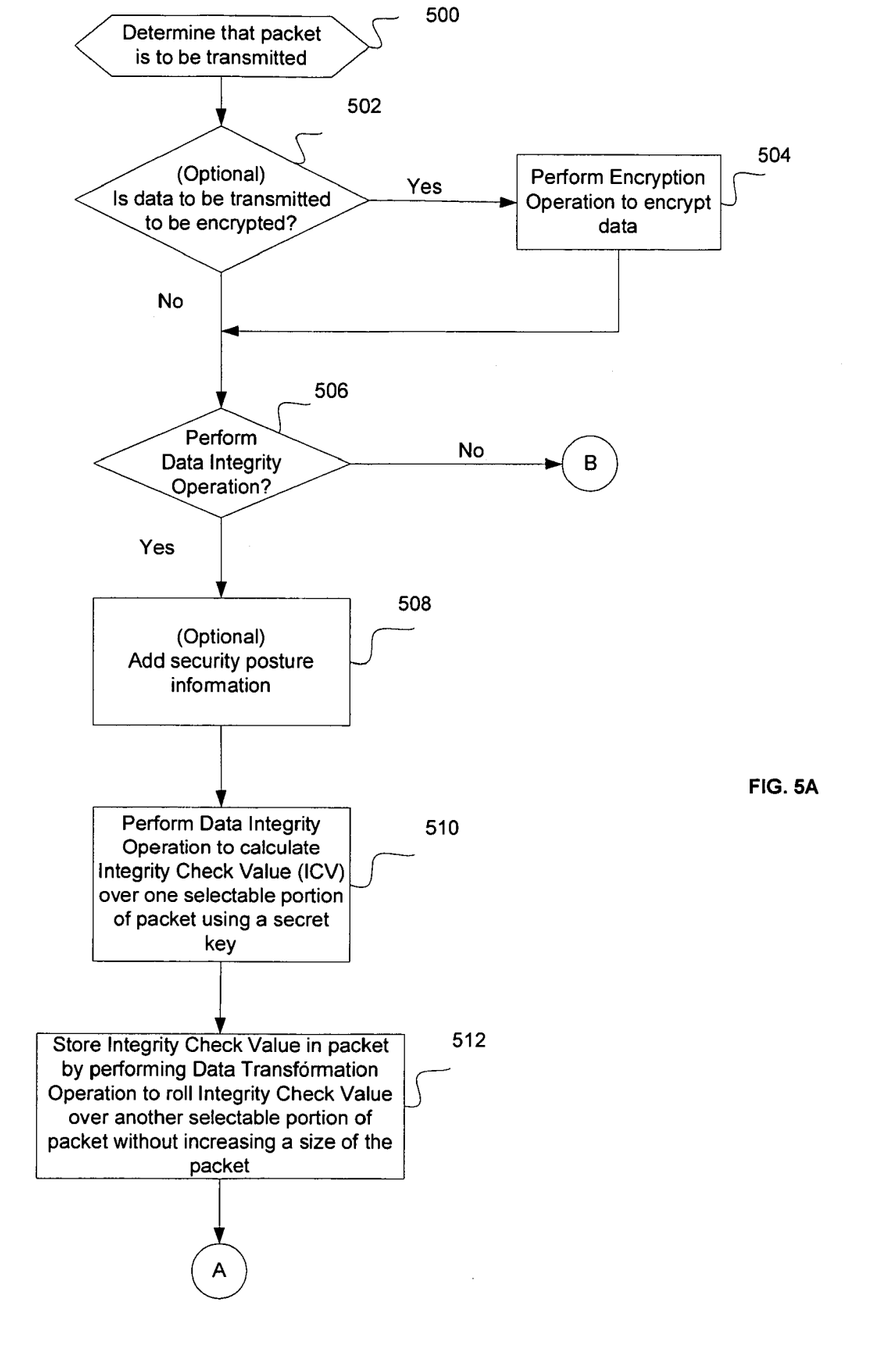
Figure 5B:
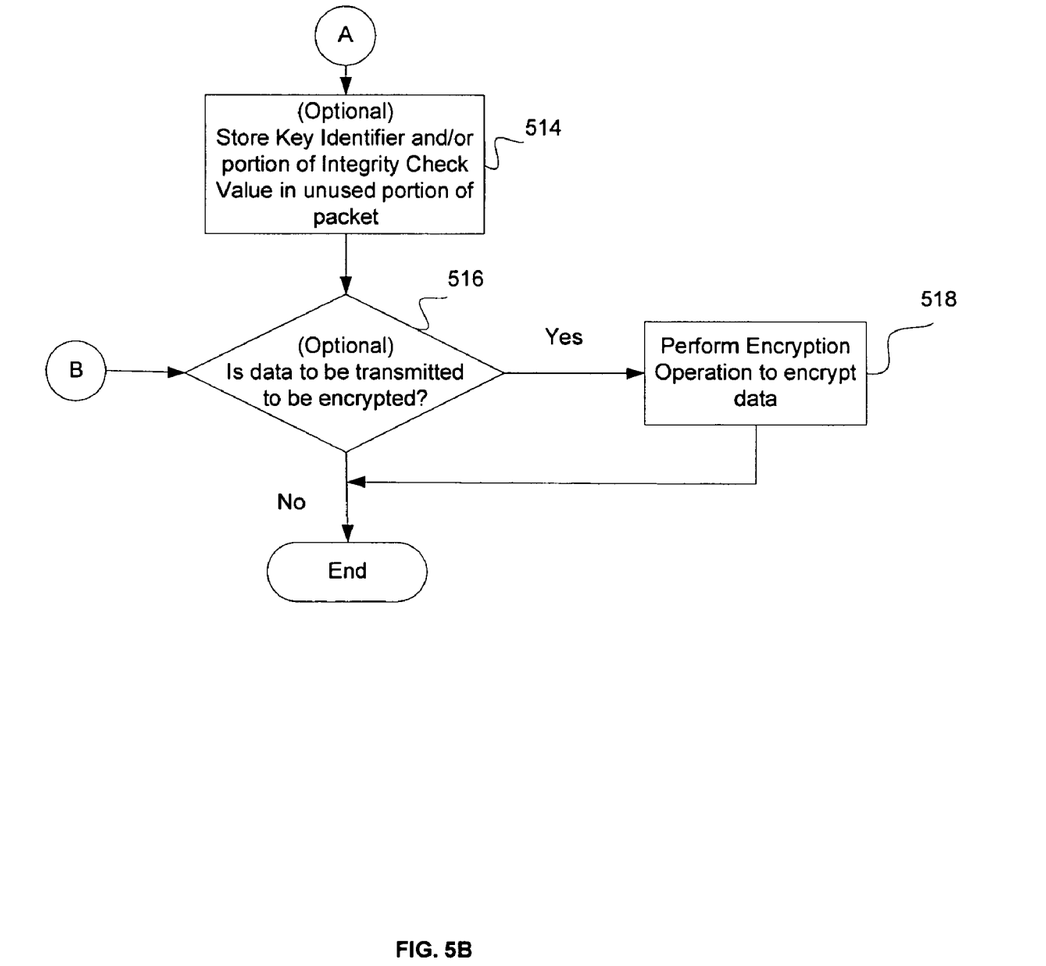

FIG. 5 illustrates operations for processing a packet that is about to be transmitted in accordance with certain embodiments. The processing of FIG. 5 is illustrated in FIGS. 5A and 5B. In particular, the processing continues from FIG. 5A to FIG. 5B.

In FIG. 5A, control begins at block 500 with the authenticity system 210 determining that a packet is about to be transmitted from a computing device 200, 240. The computing device 200, 240 may be an intermediary through which the packet has passed before reaching a final destination or may be the original sender of the packet. The packet is transmitted from a computing device 200, 240. In block 502, the authenticity system 210 optionally determines whether the data to be transmitted is to be encrypted. The determination may be based on Out-Of-Band negotiations that occurred between a sender computing device 200, 240 and a receiver computing device 200, 240 or based on a flag set in a field of the packet. If so, processing continues to block 504, otherwise, processing continues to block 506. In block 504, the authenticity system 210 performs an encryption operation to encrypt the data. In block 506, the authenticity system 210 determines whether a data integrity operation is to be performed. The determination may be based on Out-Of-Band negotiations that occurred between a sender computing device 200, 240 and a receiver computing device 200, 240. Also, the particular data integrity operation to be used may be negotiated. If so, processing continues to block 508, otherwise, processing continues to block 516 (FIG. 5B). In block 508, the authenticity system 210 optionally adds security posture information to the packet. In block 510, the authenticity system 210 performs a data integrity operation to calculate an integrity check value over one selectable portion of the packet (e.g., a portion of the header) using a secret key.

The one selectable portion of the packet is selectable in that the portion of the packet to be used for calculating the integrity check value may be selected (e.g., during Out-Of-Band negotiations). In certain embodiments, the data integrity operation is performed over a portion of the packet that is interpreted by a receiving computing device 200, 240 rather than by an intermediary 220, 230. In certain embodiments, the data integrity operation is performed over the initial part of the packet up to the beginning of the encrypted portion of the packet. In certain embodiments, the secret key is negotiated during Out-Of-Band negotiations that occur between a sender computing device 200, 240 and a receiver computing device 200, 240. In certain embodiments, VLAN tags are used to convey information that is used to select a secret key.

In block 512, the authenticity system 210 stores the integrity check value in the packet by performing a data transformation operation to roll the integrity check value over another ("the other") selectable portion of the packet (e.g., over the existing payload) without increasing a size of the packet. By rolling the integrity check value over the other portion of the packet, the information in this portion of the packet is scrambled, which provides added security to the information that is being transmitted. The other selectable portion of the packet is selectable in that the portion of the packet to be used for performing the data transformation operation may be selected (e.g., during Out-Of-Band negotiations). Any portion of the packet that the integrity check value is rolled over may not be used by the data integrity operation to compute the integrity check value. In certain embodiments, the other portion of the packet may be the data field, which may contain plaintext or encrypted data. In certain embodiments, the data transformation operation is a reversible operation (e.g., an eXclusive-OR (XOR) operation).

From block 512 (FIG. 5A), processing continues to block 514 (FIG. 5B). In block 514, the authenticity system 210 optionally stores a key identifier and/or a portion of the integrity check value in an unused (or redundant) portion of the packet. The unused portion of the packet may not be used by the data integrity operation to compute the integrity check value. The key identifier is used to identify a secret key. For example, if the key identifier value is 1, a particular secret key is to be used by the receiver computing device 200, 240, and, if the key identifier value is 2, another secret key is to be used by the receiver computing device 200, 240. The portion of the integrity check value that is stored depends on the size of the unused field. In some embodiments, the portion is the entire integrity check value. As another example, if the header portion of the packet has a field that is not being used to compute the integrity check value and is not being used to store other information, then that field may be used to store the key identifier and/or the portion of the integrity check value. As yet another example, the VLAN field 414 may include bits reserved for future use or bits that are not used by the application program sending the packet, and these redundant bits may be used to store the key identifier and/or the portion of the integrity check value.

In block 516, authenticity system 210 optionally determines whether the data to be transmitted is to be encrypted. This operation may be performed if encryption was not performed earlier in 504. The determination may be based on Out-Of-Band negotiations that occurred between a sender computing device 200, 240 and a receiver computing device 200, 240. If so, processing continues to block 518, otherwise, processing by the authenticity system 210 ends. In block 518, the authenticity system 210 performs an encryption operation to encrypt the data and processing by the authenticity system 210 ends. At this time, the packet may be transmitted over a communication path 270.

Blocks 502 and 514 illustrate optional processing. In certain embodiments, the data may not need to be encrypted, and no encryption is performed. In certain other embodiments, the encryption is performed either at block 504 or at block 518 or not at all. Moreover, in block 504, encryption occurs before the data transformation operation, while in block 518, encryption occurs after the data transformation operation. Also, block 508 illustrates optional processing. In certain embodiments, security posture information is added to the packet, and, in other embodiments, security posture information may not be added to the packet.

Figure 6:
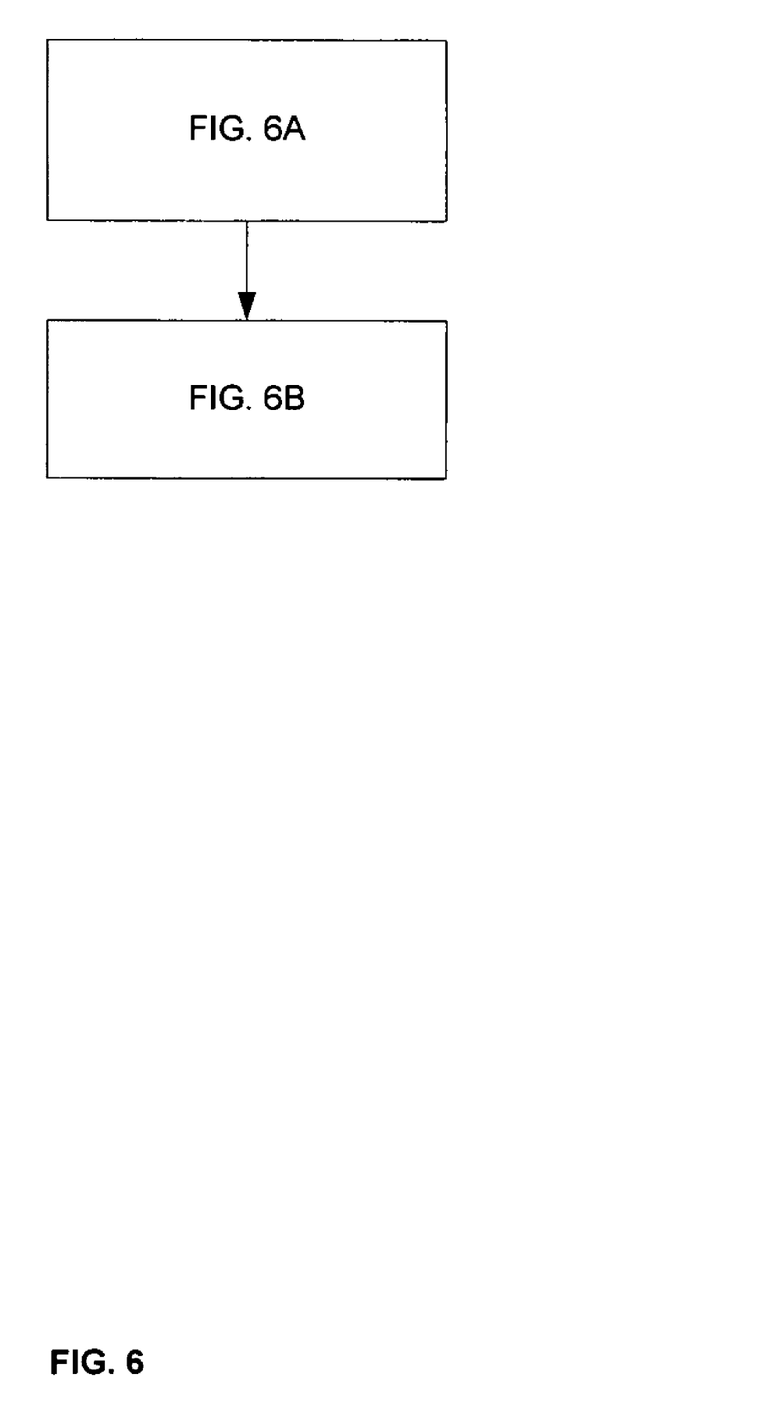
Figure 6A:
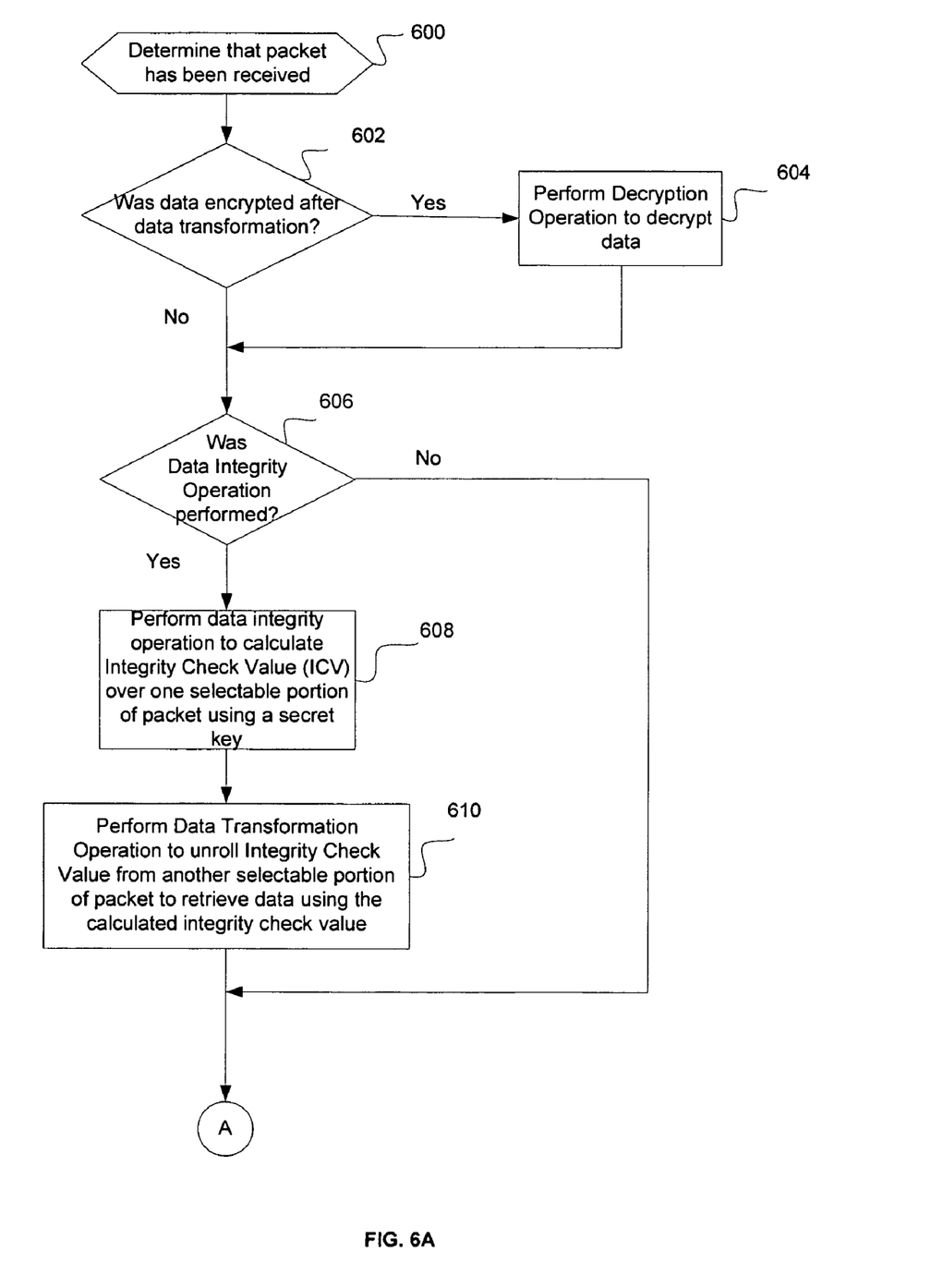
Figure 6B:
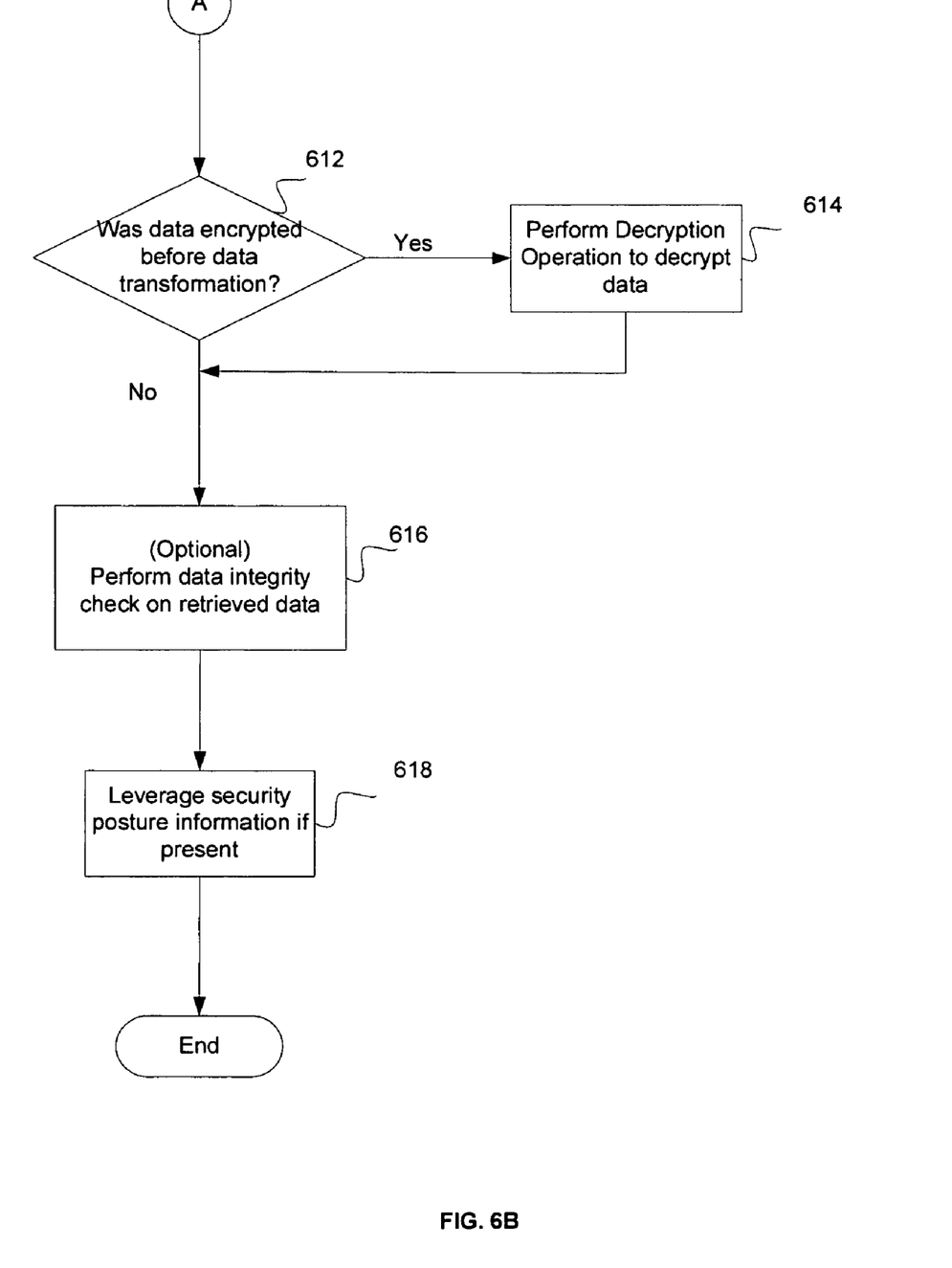

FIG. 6 illustrates operations for processing a packet that has been received in accordance with certain embodiments. The processing of FIG. 6 is illustrated in FIGS. 6A and 6B. In particular, the processing continues from FIG. 6A to FIG. 6B.

In FIG. 6A, control begins at block 600 with the authenticity system 210 determining that a packet has been received at a computing device 200, 240. The computing device 200, 240 may be an intermediary through which the packet passes before reaching a final destination or may be the final destination of the packet. In block 602, the authenticity system 210 determines whether the received data was encrypted after the data transformation operation was performed. The determination may be based on Out-Of-Band negotiations that occurred between a sender computing device 200, 240 and a receiver computing device 200, 240 or based on a flag set in a field of the packet (e.g., as part of a VLAN tag). If so, processing continues to block 604, otherwise, processing continues to block 606. In block 604, the authenticity system 210 performs a decryption operation to decrypt the data. In block 606, the authenticity system 210 determines whether a data integrity operation was performed. The determination may be based on Out-Of-Band negotiations that occurred between a sender computing device 200, 240 and a receiver computing device 200, 240 or based on a flag set in a field of the packet. Also, the particular data integrity operation that was used may have been negotiated. If the data integrity operation was performed, processing continues to block 608, otherwise, processing continues to block 612 (FIG. 6B). In block 608, the authenticity system 210 performs a data integrity operation to calculate an integrity check value over one selectable portion of the packet using a secret key. The authenticity system 210 determines the secret key used to calculate the integrity check value using information in, for example, the VLAN identifier in the VLAN field 414 of a packet 400, in the source address of the sender, or other information within the packet with which the secret key may be associated. The location of the secret key may also have been negotiated. The authenticity system 210 calculates the integrity check value using this secret key.

In block 610, the authenticity system 210 performs a data transformation operation to unroll the integrity check value from another selectable portion of the packet to retrieve data. The data transformation operation uses the calculated integrity check value. The determination may be based on Out-Of-Band negotiations that occurred between a sender computing device 200, 240 and a receiver computing device 200, 240 or based on a flag set in a field of the packet. In certain embodiments, the data transformation operation performed on a received packet is a reverse data transformation operation relative to the data transformation operation performed on the transmitted packet.

From block 610 (FIG. 6A), processing continues to block 612 (FIG. 6B). In block 612, the authenticity system 210 determines whether the data was encrypted before the data transformation operation. The determination may be based on Out-Of-Band negotiations that occurred between a sender computing device 200, 240 and a receiver computing device 200, 240 or based on a flag set in a field of the packet. If so, processing continues to block 614, otherwise, processing continues to block 616. In block 614, the authenticity system 210 performs a decryption operation to decrypt the data.

In block 616, the authenticity system 210 optionally performs a data integrity check on the accessed data to verify whether the data in the packet was modified during transmission. In embodiments in which the integrity check value has been transmitted in an unused (or redundant) portion of the packet, the stored integrity check value may be compared to the calculated integrity check value to perform the data integrity check. In embodiments in which the integrity check value may not be stored, the data integrity check may be performed inherently by validation of an integrity check value for an upper layer protocol (e.g. TCP/UDP) or explicitly by validating the integrity of the underlying data using some other data integrity operation. The data integrity check is a data integrity operation and may be the same data integrity operation as or a different data integrity operation from the data integrity operation used in block 608.

In block 618, the authenticity system 210 leverages security posture information if such information is present. In particular, the security posture information may be leveraged to make a security decision about, for example, role based access control or administrative security policy compliance.

Thus, embodiments may carry the integrity check value over an existing portion of the packet or frame without increasing the size of the packet or frame. Embodiments may add a data integrity mechanism without increasing the size of the packet, which allows this mechanism to be used to add security to protocols that may not currently support security functionality, while remaining compatible with the existing network infrastructure. Embodiments are capable of eliminating the overhead of expanding the packet/frame size by allowing the integrity check value to be carried over the existing packet/frame by a data transformation operation (i.e., the integrity check value is rolled over the existing payload) and, optionally, by leveraging one or more unused (or redundant) fields in the packet to carry this data.

Thus, embodiments are capable of providing a mechanism for determining the integrity of data communications. Also, embodiments are capable of providing a role-based authenticity of communications traffic using a trusted intermediary by leveraging suitable extensions, such as VLAN tags to convey any additional data. Embodiments may be applicable to any security mechanism employing data integrity operations for packets. Embodiments may also be used to communicate the security posture of an end-station, frame-by-frame, to peers (e.g., other computing devices) and to the network infrastructure.

Embodiments are capable of removing the overhead for transmission of the integrity check value as an additional data item, instead choosing to convey this data over the existing packet by leveraging existing fields or by performing a transparent data transformation operation over the packet's payload.

Furthermore, embodiments may be used with any layer of the OSI model, and define a mechanism that transcends any logical or hierarchical divides in a given network stack. Additionally, embodiments may be employed at any OSI layer (e.g., with changes to the scope of data used to calculate the integrity check value and subsequent application of this within the packet). For example, for a Layer 2 solution, the integrity check value may be calculated over the IP, TCP/IP, VLAN and MAC headers, whereas in a Layer 3 solution, the integrity check value may be calculated over the IP and TCP/IP headers.

ADDITIONAL EMBODIMENT DETAILS

The described embodiments may be implemented as a method, apparatus, system or article of manufacture using programming and/or engineering techniques to produce software, firmware, hardware, or any combination thereof. The terms "article of manufacture" and "circuitry" as used herein refer to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any suitable information bearing medium. Additionally, the devices, adaptors, etc., may be implemented in one or more integrated circuits on the adaptor or on the motherboard.

The term logic may include, by way of example, software or hardware and/or combinations of software and hardware.

The illustrated operations of FIGS. 5 and 6 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method capable of storing information in a packet, comprising:
performing a data integrity operation over one selectable portion of the packet to calculate an integrity check value using a secret key, wherein the one selectable portion of the packet includes a Virtual Local Area Network (VLAN) field, an Internet Protocol (IP) field, and a Transmission Control Protocol (TCP)/User Datagram Protocol (UDP) field; and
performing a data transformation operation over another selectable portion of the packet to store the integrity check value in the other portion of the packet, without increasing a size of the packet, wherein the another selectable portion of the packet is a data field;
wherein the data transformation operation comprises a reversible operation.

2. The method of claim 1, wherein data in a data field of the packet is encrypted before the data transformation operation is performed.

3. The method of claim 1, wherein data in a data field of the packet is encrypted after the data transformation operation is performed.

4. The method of claim 1, further comprising:
receiving the packet;
performing the data integrity operation over the one portion of the packet to calculate the integrity check value; and
performing the data transformation operation over the other portion of the packet to retrieve data from the packet using the calculated integrity check value.

5. The method of claim 4, further comprising:
performing a data integrity check to verify whether the retrieved data in the packet was modified during transmission.

6. The method of claim 1, wherein the secret key is negotiated between a first computing device transmitting the packet and a second computing device receiving the packet.

7. The method of claim 1, wherein a field of the packet includes one or more tags that are capable of identifying a secret key used to calculate the integrity check value, the data transformation operation, and one or more portions of the packet to be used for the data transformation operation.

8. The method of claim 1, wherein a field of the packet includes one or more tags that are capable of providing additional identity information, security posture information, and role information, which may be leveraged by a recipient for applying one or more access control policies.

9. The method of claim 1, further comprising: storing at least one of a key identifier or a portion of the integrity check value in an unused portion of the packet in response to determining that the data transformation operation to be performed.

10. A system, comprising: a packet to be transmitted over a communication path; a network adapter that is coupled to the communication path; and an authenticity system coupled to the network adapter; wherein the authenticity system performs a data integrity operation over one selectable portion of the packet to calculate an integrity check value using a secret key, wherein the one selectable portion of the packet includes a Virtual Local Area Network (VLAN) field, an Internet Protocol (IP) field, and a Transmission Control Protocol (TCP)/User Datagram Protocol (UDP) field; and
wherein the authenticity system performs a data transformation operation over another selectable portion of the packet to store the integrity check value in the other portion of the packet, without increasing a size of the packet, wherein the another selectable portion of the packet is a data field;
wherein the data transformation operation comprises a reversible operation.

11. The system of claim 10, wherein data in a data field of the packet is encrypted before the data transformation operation is performed.

12. The system of claim 10, wherein data in a data field of the packet is encrypted after the data transformation operation is performed.

13. The system of claim 10, wherein the authenticity system is operable to: receive the packet;
perform the data integrity operation over the one portion of the packet to calculate the integrity check value; and
perform the data transformation operation over the other portion of the packet to retrieve data from the packet using the calculated integrity check value.

14. The system of claim 13, wherein the authenticity system is operable to:
perform a data integrity check to verify whether the retrieved data in the packet was modified during transmission.

15. A method capable of retrieving information from a packet, further comprising:
receiving a packet, including, a Virtual Local Area Network (VLAN) field, an Internet Protocol (IP) field, a Transmission Control Protocol (TCP)/User Datagram Protocol (UDP) field, and a data field;
performing a data integrity operation over one portion of the packet to calculate an integrity check value using a secret key, wherein the one portion of the packet includes the Virtual Local Area Network (VLAN) field, the Internet Protocol (IP) field, and the Transmission Control Protocol (TCP)/User Datagram Protocol (UDP) field;
storing the integrity check value in the data field by performing a data transformation operation over the data field without increasing a size of the packet; and
performing a data transformation operation over another portion of the packet to retrieve data from the packet using the calculated integrity check value, wherein the other portion of the packet is the data field;
wherein the data transformation operation comprises a reverse data transformation operation relative to another data transformation operation performed on the packet prior to the packet being received.

16. The method of claim 15, further comprising:
performing a data integrity check to verify whether the retrieved data in the packet was modified during transmission.

17. The method of claim 15, wherein a field of the packet includes one or more tags that are capable of providing additional identity information, security posture information, and role information, which may be leveraged to apply one or more access control policies.

18. An article of manufacture for storing information in a packet, wherein the article of manufacture comprises a computer readable medium storing instructions, and wherein the article of manufacture is operable to:
perform a data integrity operation over one selectable portion of the packet to calculate an integrity check value using a secret key, wherein the one selectable portion of the packet includes a Virtual Local Area Network (VLAN) field, an Internet Protocol (IP) field, and a Transmission Control Protocol (TCP)/User Datagram Protocol (UDP) field; and
perform a data transformation operation over another selectable portion of the packet to store the integrity check value in the other portion of the packet, without increasing a size of the packet, wherein the another selectable portion of the packet is a data field;
wherein the data transformation operation comprises a reversible operation.

19. The article of manufacture of claim 18, wherein data in a data field of the packet is encrypted before the data transformation operation is performed.

20. The article of manufacture of claim 18, wherein data in a data field of the packet is encrypted after the data transformation operation is performed.

21. The article of manufacture of claim 18, wherein the article of manufacture is operable to:
receive the packet;
perform the data integrity operation over the one portion of the packet to calculate the integrity check value; and
perform the data transformation operation over the other portion of the packet to retrieve data from the packet using the calculated integrity check value.

22. The article of manufacture of claim 21, wherein the article of manufacture is operable to:
perform a data integrity check to verify whether the retrieved data in the packet was modified during transmission.

23. The article of manufacture of claim 18, wherein the secret key is negotiated between a first computing device transmitting the packet and a second computing device receiving the packet.

24. The article of manufacture of claim 18, wherein a field of the packet includes one or more tags that are capable of identifying a secret key used to calculate the integrity check value, the data transformation operation, and one or more portions of the packet to be used for the data transformation operation.

25. The article of manufacture of claim 18, wherein a field of the packet includes one or more tags that are capable of providing additional identity information, security posture information, and role information, which may be leveraged by a recipient for applying one or more access control policies.

26. The article of manufacture of claim 18, wherein the article of manufacture is operable to:
store at least one of a key identifier or a portion of the integrity check value in an unused portion of the packet.

* * * * *